(12) United States Patent
Lo

(10) Patent No.: US 7,924,750 B1
(45) Date of Patent: Apr. 12, 2011

(54) METHOD AND APPARATUS FOR ESTABLISHING A COMMUNICATION MODE BETWEEN NETWORK DEVICES IN A NETWORK

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/697,594

(22) Filed: Feb. 1, 2010

Related U.S. Application Data

(63) Continuation of application No. 11/450,693, filed on Jun. 9, 2006, now Pat. No. 7,660,272.

(51) Int. Cl.
*H04B 7/00* (2006.01)
*H04L 12/28* (2006.01)

(52) U.S. Cl. ............... 370/278; 370/395.2; 375/286; 709/224

(58) Field of Classification Search ............ 370/241, 370/333–449, 242–297; 709/201–242; 375/219–316
See application file for complete search history.

(56) References Cited

U.S. PATENT DOCUMENTS

| 7,065,075 | B1 * | 6/2006 | Lo | 370/386 |
| 7,415,013 | B1 * | 8/2008 | Lo | 370/389 |
| 7,660,272 | B1 * | 2/2010 | Lo | 370/278 |
| 2005/0207360 | A1 | 9/2005 | Costo et al. | |
| 2005/0207460 | A1 * | 9/2005 | Koda | 372/38.02 |

OTHER PUBLICATIONS 802.3u; Information technology—Telecommunications and information exchange between systems—local and metropolitan area networks—Specific requirements; Part 3: Carrier Sense Multiple Access with Collison Detection (CSMA/CD) access method and physical layer specifications; Section Two; Clauses 21 through 30 of IEEE Std 802.3-2002; IEEE Computer Society; Sponsored by the LAN/MAN Standards Committee; Mar. 8, 2002; pp. 1-344.

* cited by examiner

*Primary Examiner* — Afsar M. Qureshi

(57) ABSTRACT

A computer program comprises instructions for advertising a plurality of communication modes. In response to detecting that one or more communication modes of a second physical layer module have been advertised to a first physical layer module, the computer program synchronizes the communication mode between the first and second physical layer modules based on the plurality of advertised communication modes of the first physical layer module and the one or more advertised communication modes of the second physical layer module. In response to not having detected that one or more communication modes of the second physical layer module have been advertised to the first physical layer module, the computer program detects whether the second physical layer module has been preset to communicate in a full duplex mode, and sets the communication mode between the first physical layer module and the second physical layer module to the full duplex mode.

19 Claims, 3 Drawing Sheets

METHOD AND APPARATUS FOR ESTABLISHING A COMMUNICATION MODE BETWEEN NETWORK DEVICES IN A NETWORK

CROSS-REFERENCE TO RELATED APPLICATIONS

This application is a continuation of U.S. patent application Ser. No. 11/450,693, filed Jun. 9, 2006. The disclosure of the above application is incorporated herein by reference in its entirety.

FIELD

The present disclosure relates to network systems, and more particularly to automatically negotiating communication modes of network devices.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

A network device generally comprises a physical layer (PHY) module and a medium access controller (MAC). In wired networks, the PHY connects the network device to a cable. The MAC provides an interface between the PHY and a host. Referring now to FIG. 1, a first network device 20 is connected to a second network device 22 using a cable 14. In a typical network, the first network device 20 may be called a local device and the network device 22 may be called a link partner of the local device, or vice versa.

The first network device 20 comprises a PHY 24 and a MAC 26. The PHY 24 is coupled to the cable 14 via a connector 12. The second network device 22 comprises a PHY 28 and a MAC 30. The PHY 28 is coupled to the cable 14 via a connector 15. In an Ethernet-based network, the cable 14 is generally a CAT 5 or CAT 6 twisted-pair cable. The connectors 12 and 15 are generally RJ45 connectors.

A PHY of a network device may communicate at different speeds and use different modes of communication depending on the topology of the network. For example, the PHY of the network device that operates in a Fast Ethernet network may communicate at 100 Mbps (Mega bits per second) while the PHY of the network device that operates in a Gigabit Ethernet network may communicate at 1000 Mbps (i.e., 1 Giga bits per second). Additionally, the PHY of the network device that communicates using a full duplex mode can transmit and receive data simultaneously while the PHY of the network device that communicates using a half duplex mode can only transmit or receive data at a given time. Consequently, data transfer rates are usually higher in full duplex mode than in half duplex mode.

PHY's of some network devices use a mechanism called auto-negotiation to exchange communication mode information. For example, PHY 24 of the local device 20 may advertise the communication mode of PHY 24 to PHY 28 of the link partner 22. Additionally, PHY 24 may detect the communication mode of PHY 28. Thereafter, the communication modes of PHY 24 and PHY 28 may be synchronized.

Specifically, auto-negotiation is a mechanism that takes control of the cable 14 when a connection is established between the PHY 24 of the first network device 20 and the PHY 28 of the second network device 22. Using auto-negotiation, the PHY 24 advertises the communication modes in which PHY 24 can communicate and detects the communication modes in which PHY 28 can communicate. Thereafter, auto-negotiation automatically synchronizes the communication modes of PHY 24 and PHY 28 so that the first network device 20 and the second network device 22 may communicate at the highest possible data transfer rate.

PHY's of some network devices, however, may be incapable of auto-negotiation. For example, PHY 24 may be capable of auto-negotiation, but PHY 28 may be incapable of auto-negotiation. In that case, PHY 24 uses a mechanism called parallel detection and communicates with PHY 28 in half duplex mode according to the IEEE 802.3u standard, which is hereby incorporated by reference in its entirety.

SUMMARY

A physical layer (PHY) module of a network device comprises an auto-negotiation module that enables an auto-negotiation mode when the network device one of powers up and loses a link. The PHY comprises a control module that communicates with the auto-negotiation module, and that generates a full duplex signal when a PHY of a link partner is in a full duplex mode and does not have the auto-negotiation mode enabled, wherein the PHY sets a duplex mode to the full duplex mode based on the full duplex signal.

In another feature, the auto-negotiation module sets the duplex mode of the PHY to the full duplex mode based on the full duplex signal.

In another feature, the control module sets the duplex mode of the PHY to the full duplex mode based on the full duplex signal.

In another feature, the auto-negotiation module determines whether the PHY of the link partner is in the auto-negotiation mode.

In another feature, the control module does not generate the full duplex signal when the PHY of the link partner is in the auto-negotiation mode.

In another feature, the network device parallel detects the PHY of the link partner when the PHY of the link partner is not in the auto-negotiation mode. The PHY of the network device does not parallel detect the PHY of the link partner when the PHY of the link partner is in the auto-negotiation mode.

In another feature, the PHY of the network device and the PHY of the link partner communicate in full duplex mode.

In another feature, a network device comprises the PHY. The network device further comprises a medium access controller (MAC) module.

In still other features, a method comprises enabling an auto-negotiation mode in a physical layer (PHY) module when a network device one of powers up and loses a link, generating a full duplex signal when a PHY of a link partner is in a full duplex mode and does not have the auto-negotiation mode enabled, and setting a duplex mode to the full duplex mode based on the full duplex signal.

In another feature, the method further comprises determining whether the PHY of the link partner is in the auto-negotiation mode.

In another feature, the method further comprises not generating the full duplex signal when the PHY of the link partner is in the auto-negotiation mode.

In another feature, the method further comprises parallel detecting the PHY of the link partner when the PHY of the link partner is not in the auto-negotiation mode. The method further comprises not parallel detecting the PHY of the link partner when the PHY of the link partner is in the auto-negotiation mode.

In another feature, the method further comprises communicating between the PHY of the network device and the PHY of the link partner in full duplex mode.

In still other features, a physical layer (PHY) module of a network device comprises auto-negotiation means for enabling an auto-negotiation mode when the network device one of powers up and loses a link. The PHY comprises control means for communicating with the auto-negotiation means, and generating a full duplex signal when a PHY of a link partner is in a full duplex mode and does not have the auto-negotiation mode enabled, wherein the PHY sets a duplex mode to the full duplex mode based on the full duplex signal.

In another feature, the auto-negotiation means sets the duplex mode of the PHY to the full duplex mode based on the full duplex signal.

In another feature, the control means sets the duplex mode of the PHY to the full duplex mode based on the full duplex signal.

In another feature, the auto-negotiation module determines whether the PHY of the link partner is in the auto-negotiation mode.

In another feature, the control means does not generate the full duplex signal when the PHY of the link partner is in the auto-negotiation mode.

In another feature, the PHY of the network device parallel detects the PHY of the link partner when the PHY of the link partner is not in the auto-negotiation mode. The PHY of the network device does not parallel detect the PHY of the link partner when the PHY of the link partner is in the auto-negotiation mode.

In another feature, the PHY of the network device and the PHY of the link partner communicate in full duplex mode.

In another feature, a network device comprises the PHY. The network device further comprises a medium access controller (MAC) module.

In still other features, a computer program stored for use by a processor for operating a physical layer (PHY) module of a network device comprises enabling an auto-negotiation mode when the network device one of powers up and loses a link, generating a full duplex signal when a PHY of a link partner is in a full duplex mode and does not have the auto-negotiation mode enabled, and setting a duplex mode to the full duplex mode based on the full duplex signal.

In another feature, the computer program further comprises determining whether the PHY of the link partner is in the auto-negotiation mode.

In another feature, the computer program further comprises not generating the full duplex signal when the PHY of the link partner is in the auto-negotiation mode.

In another feature, the computer program further comprises parallel detecting the PHY of the link partner when the PHY of the link partner is not in the auto-negotiation mode. The computer program further comprises not parallel detecting the PHY of the link partner when the PHY of the link partner is in the auto-negotiation mode.

In another feature, the computer program further comprises communicating between the PHY of the network device and the PHY of the link partner in full duplex mode.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
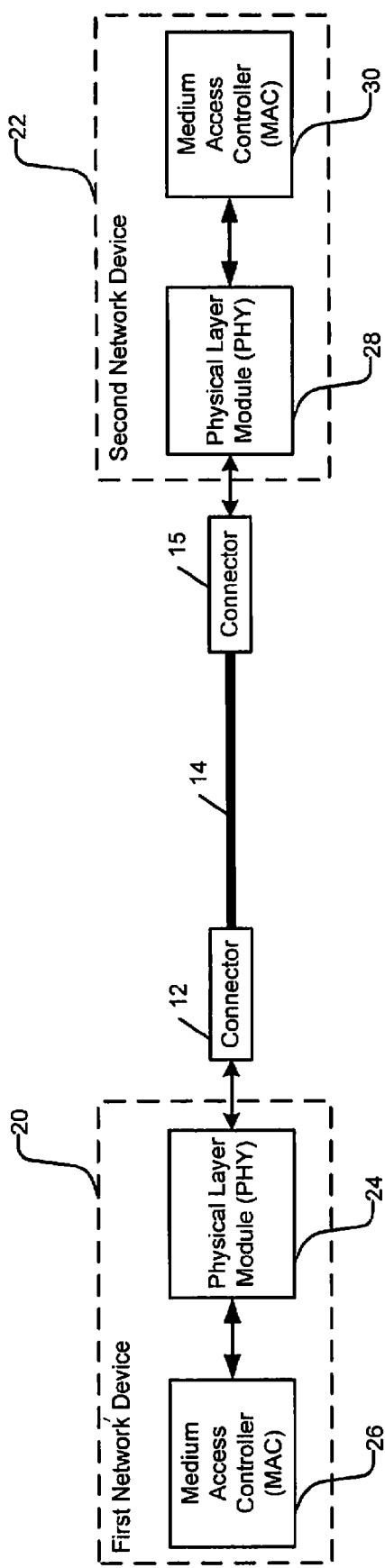
FIG. 1 is a functional block diagram of an exemplary network comprising a first network device communicating with a second network device via a twisted-pair cable according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

In an exemplary network, a physical layer (PHY) module of a first network device (i.e., PHY1) and a PHY of a second network device (i.e., PHY2) may be preset to communicate in full duplex mode. If, however, PHY1 is capable of auto-negotiating and PHY2 is not, PHY1 may parallel detect PHY2, and PHY1 may default to half duplex mode. Consequently, PHY1 and PHY2 may have incompatible communication modes.

One way to resolve the incompatibility is to initially set PHY1 to full duplex and later enable auto-negotiation in PHY1 when PHY1 senses that PHY2 is auto-negotiating. Thereafter, PHY1 and PHY2 may auto-negotiate and communicate in full duplex mode.

Another way to resolve the incompatibility is to not preset PHY1 to full duplex mode. Instead, auto-negotiation is initially enabled in PHY1. That is, auto-negotiation is enabled in PHY1 on startup or when a link is lost. If auto-negotiation is also enabled in PHY2, PHY1 and PHY2 may auto-negotiate and communicate in full duplex mode. On the other hand, if auto-negotiation is not enabled in PHY2, PHY1 may parallel detect PHY2. Thereafter, PHY1 is set to full duplex mode instead of defaulting PHY1 to half duplex mode. Thus, communication modes of PHY1 and PHY2 are synchronized, and PHY1 and PHY2 communicate in full duplex mode.

Figure 2:
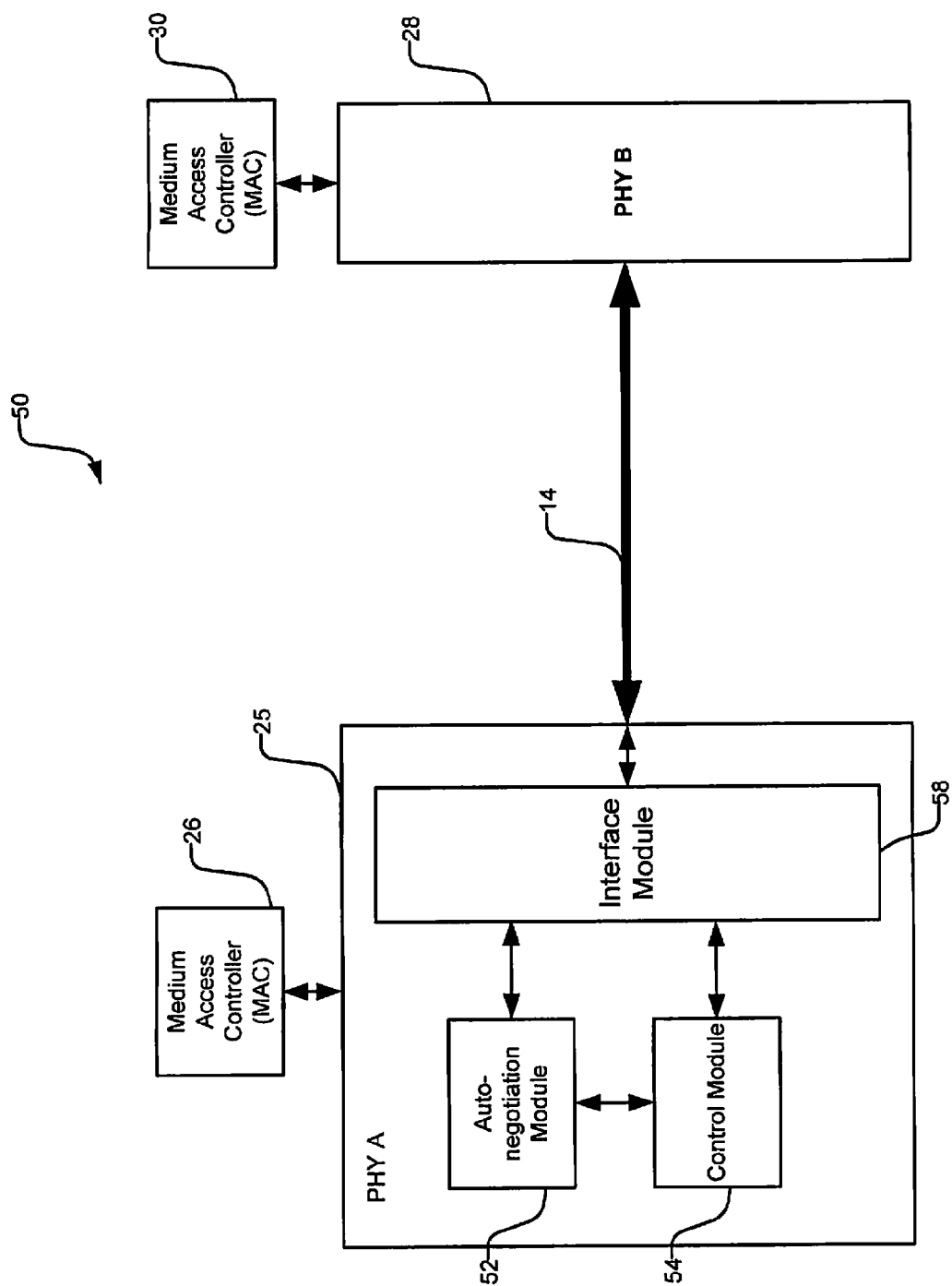
FIG. 2 is a functional block diagram of a system used by a physical layer (PHY) module of a network device to parallel detect to full-duplex mode according to the present disclosure.

Referring now to FIG. 2, a system 50 used by a PHY to parallel detect to full duplex mode is shown. A PHY 25 communicates with a PHY 28 using a cable 14. The PHY 25 comprises an auto-negotiation module 52, a control module 54, and an interface module 58. The interface module 58 interfaces the PHY 25 and the auto-negotiation module 52 to the cable 14. The interface module 58 comprises circuits that enable the PHY 25 to communicate in either full duplex mode or half duplex mode over the cable 14. The control module 54 determines whether the PHY 25 communicates in full duplex mode or half duplex mode.

Specifically, PHY 25 is not preset to full duplex mode. Instead, auto-negotiation is initially enabled in PHY 25. That is, auto-negotiation is enabled in PHY 25 on startup or when a link is lost. The auto-negotiation module 52 detects whether PHY 28 is auto-negotiating. If the auto-negotiation module 52 determines that PHY 28 is auto-negotiating, the auto-negotiation module 52 sets a flag in a register indicating that PHY 28 is auto-negotiating. The control module 54 checks the flag. If the control module 54 finds that the flag indicates that PHY 28 is auto-negotiating, PHY 25 and PHY 28 auto-negotiate and communicate in full duplex mode.

If, however, the auto-negotiation module 52 determines that PHY 28 is not auto-negotiating, but is instead preset to full duplex mode, the auto-negotiation module 52 sets the flag in the register indicating that PHY 28 is not auto-negotiating, but is instead preset to full duplex mode. The control module 54 checks the flag. If the control module 54 finds that the flag in the register indicates that PHY 28 is not auto-negotiating, but is instead preset to full duplex mode, the control module 54 generates a full duplex signal. Based on the full duplex signal, PHY 25 parallel detects PHY 28, and the control module 54 sets PHY 25 to full duplex mode instead of defaulting PHY 25 to half duplex mode. Thus, PHY 25 and PHY 28 communicate in full duplex mode.

Figure 3:
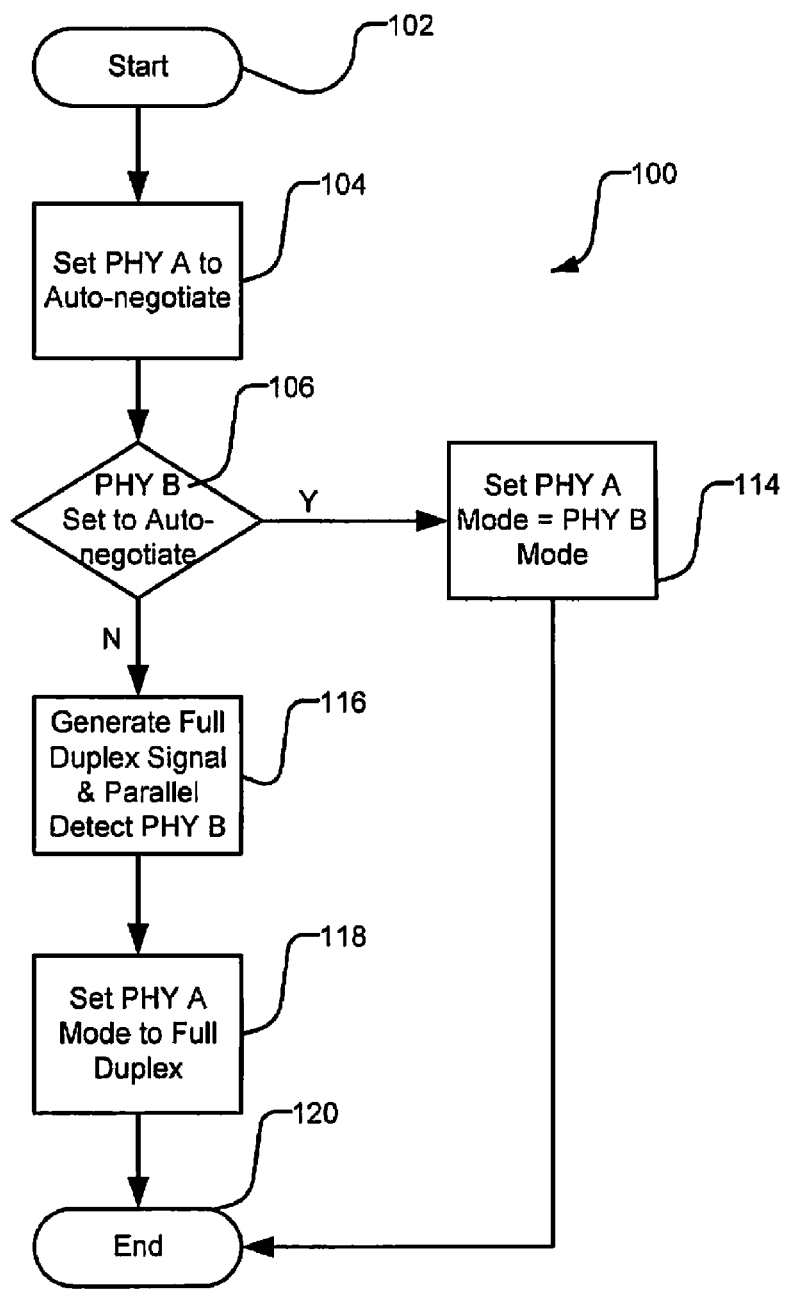
FIG. 3 is a flowchart of a method used by a PHY to parallel detect to full duplex mode according to the present disclosure.

Referring now to FIG. 3, a method 100 used by a PHY to parallel detect to full duplex mode begins at step 102. A PHY 25 (PHY A), which communicates with a PHY 28 (PHY B), is initially enabled to auto-negotiate instead of being preset or forced to full duplex mode in step 104. An auto-negotiation module 52 in PHY A determines in step 106 whether PHY B is auto-negotiating.

If true, PHY A and PHY B auto-negotiate and communicate in full duplex mode in step 114, and the method 100 ends in step 120. If false, PHY B is not auto-negotiating but is instead preset or forced to full duplex mode. In that case, the control module 54 generates a full duplex signal, and PHY A parallel detects PHY B in step 116 based on the full duplex signal. Additionally, based on the full duplex signal, the control module 54 in PHY A sets PHY A to full duplex mode in step 118 instead of defaulting PHY A to half duplex mode. Thereafter, PHY A and PHY B communicate in full duplex mode, and the method 100 ends in step 120.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A computer program for establishing a communication mode between (i) a first physical layer module of a first network device and (ii) a second physical layer module of a second network device, the computer program being (i) stored on a tangible computer-readable storage medium and (ii) comprising instructions executable by a processor for:

advertising a plurality of communication modes of the first physical layer module to the second physical layer module, the plurality of communication modes of the first physical layer module including a half duplex mode and a full duplex mode;

detecting whether one or more communication modes of the second physical layer module have been advertised to the first physical layer module, the one or more communication modes of the second physical layer module including at least one of (i) the half duplex mode or (ii) the full duplex mode;

in response to detecting that one or more communication modes of the second physical layer module have been advertised to the first physical layer module,
synchronizing the communication mode between the first physical layer module and the second physical layer module based on the plurality of advertised communication modes of the first physical layer module and the one or more advertised communication modes of the second physical layer module; and in response to not having detected that one or more communication modes of the second physical layer module have been advertised to the first physical layer module,
detecting whether the second physical layer module has been preset to communicate in the full duplex mode, and
setting the communication mode between the first physical layer module and the second physical layer module to the full duplex mode in response to the second physical layer module having been preset to communicate in the full duplex mode.

2. The computer program of claim 1, further comprising instructions for parallel detecting the second physical layer module in response to not having detected that one or more communication modes of the second physical layer module have been advertised to the first physical layer module.

3. The computer program of claim 1, wherein the first network device is connected to the second network device through a cable.

4. The computer program of claim 3, wherein the first network device and the second network device network are in an Ethernet-based network.

5. The computer program of claim 4, wherein the cable is a CAT 5 twisted pair cable or a CAT 6 twisted pair cable.

6. The computer program of claim 1, wherein the instructions for advertising the plurality of communication modes of the first physical layer module to the second physical layer module comprises instructions for:
advertising the plurality of communication modes of the first physical layer module to the second physical layer module in response to startup of the first network device.

7. The computer program of claim 1, wherein the instructions for advertising the plurality of communication modes of the first physical layer module to the second physical layer module comprises instructions for:
advertising the plurality of communication modes of the first physical layer module to the second physical layer module in response to the first network device losing a link to the second network device.

8. A method for establishing a communication mode between (i) a first physical layer module of a first network device and (ii) a second physical layer module of a second network device, the method comprising:
advertising a plurality of communication modes of the first physical layer module to the second physical layer module, the plurality of communication modes of the first physical layer module including a half duplex mode and a full duplex mode;

detecting whether one or more communication modes of the second physical layer module have been advertised to the first physical layer module, the one or more communication modes of the second physical layer module including at least one of (i) the half duplex mode or (ii) the full duplex mode;

in response to detecting that one or more communication modes of the second physical layer module have been advertised to the first physical layer module, synchronizing the communication mode between the first physical layer module and the second physical layer module based on the plurality of advertised communication modes of the first physical layer module and the one or more advertised communication modes of the second physical layer module; and in response to not having detected that one or more communication modes of the second physical layer module have been advertised to the first physical layer module, detecting whether the second physical layer module has been preset to communicate in the full duplex mode, and setting the communication mode between the first physical layer module and the second physical layer module to the full duplex mode in response to the second physical layer module having been preset to communicate in the full duplex mode.

9. The method of claim 8, further comprising parallel detecting the second physical layer module in response to not having detected that one or more communication modes of the second physical layer module have been advertised to the first physical layer module.

10. The method of claim 8, wherein the plurality of communication modes of the first physical layer module are advertised to the second physical layer module in response to startup of the first network device.

11. The method of claim 8, wherein the plurality of communication modes of the first physical layer module are advertised to the second physical layer module in response to the first network device losing a link to the second network device.

12. The method of claim 8, wherein the first network device is connected to the second network device through a cable.

13. The method of claim 12, wherein the first network device and the second network device network are in an Ethernet-based network.

14. The method of claim 13, wherein the cable is a CAT 5 twisted pair cable or a CAT 6 twisted pair cable.

15. A first network device comprising:
a first physical layer module configured to
advertise a plurality of communication modes of the first physical layer module to a second physical layer module of a second network device, the plurality of communication modes of the first physical layer module including a half duplex mode and a full duplex mode;

detect whether one or more communication modes of the second physical layer module have been advertised to the first physical layer module, the one or more communication modes of the second physical layer module including at least one of (i) the half duplex mode or (ii) the full duplex mode;

in response to detecting that one or more communication modes of the second physical layer module have been advertised to the first physical layer module, synchronize a communication mode between the first physical layer module and the second physical layer module based on the plurality of advertised communication modes of the first physical layer module and the one or more advertised communication modes of the second physical layer module; and in response to not having detected that one or more communication modes of the second physical layer module have been advertised to the first physical layer module, detect whether the second physical layer module has been preset to communicate in the full duplex mode, and set the communication mode between the first physical layer module and the second physical layer module to the full duplex mode in response to the second physical layer module having been preset to communicate in the full duplex mode.

16. The first network device of claim 15, wherein the first physical layer module is configured to:

parallel detect the second physical layer module in response to not having detected that one or more communication modes of the second physical layer module have been advertised to the first physical layer module.

17. The first network device of claim 15, wherein the first network device is connected to the second network device through a cable.

18. The first network device of claim 17, wherein the first network device and the second network device network are in an Ethernet-based network.

19. The first network device of claim 18, wherein the cable is a CAT 5 twisted pair cable or a CAT 6 twisted pair cable.

* * * * *